United States Patent Office 3,510,449
Patented May 5, 1970

---

3,510,449
POLYPIVALOLACTONE COMPOSITIONS STABILIZED WITH MERCAPTANS
Syoichi Nagato, Juro Suzuki, and Hiroshi Miki Saitama, Japan, assignors to Daicel Ltd., Osaka, Japan, a corporation of Japan
No Drawing. Filed Dec. 20, 1967, Ser. No. 691,953
Claims priority, application Japan, Dec. 20, 1966, 41/83,359
Int. Cl. C08g 51/58
U.S. Cl. 260—45.7    3 Claims

ABSTRACT OF THE DISCLOSURE

A high molecular weight polypivalolactone and process of making same in which an aliphatic mercaptan having more than five carbon atoms or an aromatic mercaptan is incorporated in the polypivalolactone in order to protect same against thermal degradation and oxidation.

BACKGROUND OF THE INVENTION

Field of the invention

This invention relates to high molecular weight polypivalolactones and, more specifically, it relates to such polypivalolactones having improved thermal stability. It is an object of the present invention to provide, as a new composition of matter, polypivalolactone compositions having an improved thermal stability by reason of the presence therein of certain mercaptan stabilizers.

The term "polypivalolactone" as used in the following description and claims shall mean a linear consideration polyester consisting essentially of recurring ester structural units of the formula.

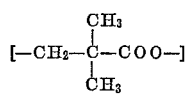

DESCRIPTION OF THE PRIOR ART

This polyester is readily prepared by the polymerization of hydroxypivalic acid or its esters as disclosed by Alderson in his U.S. Pat. 2,658,055; or by the polymerization of pivalolactone, the intromolecular ester of hydroxypivalic acid, as disclosed by Reynolds and Vickers in their British Pat. 766,347.

Polypivalolactone is the only useful polymer, among the aliphatic polyesters, which can be formed into utilizable fibers. According to our investigations, however, the polymer degrades when heated at an elevated temperature, particularly above the melting point of the polymer, e.g., about 240° C. It has now been found that polypivalolactones are liable to deteriorate on exposure to oxygen, this deterioration resulting in discoloration and eventually in the oxidative breakdown of the polypivalolactones.

SUMMARY OF THE INVENTION

Previously, no method for stabilizing such polypivalolactones was known. We have studied the stabilization and antioxidation of polypivalolactones and have discovered that certain mercaptans, when incorporated with polypivalolactone, are valuable for the stabilization of polypivalolactones against oxidation.

The thermal stabilizing compounds employed in this invention are mercaptans having more than 5 carbon atoms. A partial list of such compounds includes octadecyl mercaptan, tertiary lauryl mercaptan, normal capryl mercaptan, tertiary dodecyl mercaptan and normal amyl mercaptan. Aromatic mercaptans which are known to be operable include thiophenol. Aliphatic mercaptans having less than 4 carbon atoms, such as butyl mercaptan, are not operable as thermal stabilizers in this invention because those mercaptans have certain inherent limitations, that is, those mercaptans have a low boiling point and accordingly, the volatilize at such a high rate on heating the test sample of polypivalolactone that a thermal stabilizing substantial effect could not be observed.

A convenient way for preparing the new compositions of this invention is to dissolve the mercaptan stabilizer in a volatile solvent, add an amount of this solution to polypivalolactone sufficient to provide from 2 to 25% by weight of the mercaptan stabilizer based on the weight of the polymer, and then stir the mixture. The solvent is thereafter removed by evaporation. Alternatively, the mercaptan stabilizer can be incorporated into the polypivalolactone milling or by other known procedures. Further, the stabilizer of the present invention can be mixed in the polypivalolactone together with other additives which will be required in the final composition of the polypivalolactone such as, for example, colorants, carbon black, plasticizers, etc.

The following description requires some method of measuring and describing the extent of degradation. Accordingly, in this discussion the effect will be discused in terms of the "intrinsic viscosity" (hereinafter denoted as "$[\eta]$"). The term "intrinsic viscosity" is defined as the polymer property determined in accordance with the following relationship:

$$[\eta] = \lim_{c \to 0} (\ln.\ \eta\ \text{rel.}/c)$$

wherein the relative viscosity, $\eta$ rel., is calculated by dividing the flow time, in a capillary viscometer, of a dilute solution of the polymer in the following named solvent by the flow time for the pure solvent, 0-chlorophenol-0-cresol (of a weight ratio of 1:1). The polymer is dissolved in this solvent by heating it at 150° C. for 5 minutes. The measurement is carried out at 30° C. Between the intrinsic viscosity and the molecular weight of the polymer applies Staudinger's formula $[\eta] = KM^{\alpha}$ wherein K and $\alpha$ are constants and M is the viscosity average molecular weight. That is to say, the decrease of $[\eta]$ shows a decrease of the molecular weight of the polymer and is a measure of the decomposition of the polymer.

DESCRIPTION OF THE PREFERRED EMBODIMENTS

The invention will now be described with reference to the following examples which refer to preferred embodiments of the present invention. However, these examples are not intended to limit the invention.

Example 1

Pivalolactone was polymerized in acetonitrile in the presence of triethylamine as a catalyst and a powdery polypivalolactone was obtained. This polymer was heated under reflux for 2 hours in methyl alcohol, and then separated and dried in vacuo. The thermobalance analysis showed that the obtained polymer contained no low molecular weight volatile substance. Into samples of this polymer were mixed solutions prepared by disolving each of various stabilizers of the present invention mentioned in the following Table 1 in a proper solvent. After the solvent was removed, the polymer was heated for 30 minutes in a constant boiling point bath (245° C.). The intrinsic viscosities of the original polymer and the samples after heating were measured as described above. The results of the tests were expressed by the values of the relative stability.

The term "the relative stability" used in the following Table 1 is calculated as follows:

$$\frac{[\eta]_0 - [\eta]^5/[\eta]_0}{[\eta]_0 - [\eta]^\beta/[\eta]_0}$$

wherein $[\eta]_0$ is an intrinsic viscosity of the original polymer, $[\eta]^\beta$ is an intrinsic viscosity of the untreated polymer after the thermal stability test and $[\eta]^5$ is an intrinsic viscostity of the treated polymer after the thermal stability test. The relative stability is a parameter by which the effects of various stabilizers can be compared irrespective of the value of the intrinsic viscosity of the original polymer. As will be evident from the above formula, smaller values of said relative stability show that the effect of the staibilizer is high and a value of 1.00 shows that the stabilizer has no influence. Further, a value larger than 1.00 shows that the effect of the stabilizer is negative.

Intrinsic viscosity before the test: $[\eta]_0 = 1.07$.

| Heating time in minutes: | Intrinsic viscosity $[\eta]^5$ after the test | Appearance after the test |
|---|---|---|
| 10 | 0.84 | White. |
| 30 | 0.69 | Light brown. |
| 60 | 0.54 | Do. |
| 120 | 0.54 | Somewhat blackish brown. |

From Table 2, the thermal stabilizing effect of tertiary lauryl mercaptan is evident. The $[\eta]$ of the polymer without a stabilizer diminished much more quickly than it did when tertiary lauryl mercaptan was present in the polymer. After a heating time of 60 minutes, no further decomposition occurred.

Example 3

This example shows the influence of the amounts of the stabilizer added. The conditions of the thermal stability measurement were exactly the same as the conditions used in Example 1 except for the amount of the stabilizer added. Under these conditions, the $[\eta]$ of the polymer without a stabilizer was lowered from 1.22 to 0.61. The results are shown in Table 3.

TABLE 1

| $[\eta]_0 \to [\eta]^\beta$ | Stabilizers added | Amount of stabilizer added in percent by weight [1] | Solvent | Appearance | Intrinsic viscosity $[\eta]^5$ | Relative stability |
|---|---|---|---|---|---|---|
| 1.60→0.82 | Normal octadecyl mercaptan | 7.8 | Acetone | White | 1.32 | 0.359 |
|  | Tertiary lauryl mercaptan | 5.1 | Methanol | Light brown | 1.31 | 0.372 |
| 1.73→0.73 | Normal capryl mercaptan | 8.0 | do | White | 1.40 | 0.330 |
|  | Tertiary dodecyl mercaptan | 11.0 | do | Brown | 1.29 | 0.440 |
|  | Normal amyl mercaptan | 5.7 | do | White | 0.96 | 0.770 |
| 1.17→0.63 | Thiophenol | 6.0 | do | do | 0.86 | 0.265 |

[1] Based on the weight of the polymer.

It is evident from Table 1 that aliphatic mercaptans and aromatic mercaptans are effective as stabilizers for the improvement of the thermal stability of polypivalolactones.

Example 2

These examples show the influence of the stabilizer with respect to heating time. The conditions of thermal stability measurement were exactly the same as the conditions used in Example 1 except the heating time. The results are shown in Table 2.

TABLE 2

(1) Polypivalolactone without a stabilizer.
Intrinsic viscosity before the test: $[\eta]_0 = 1.07$.

| Heating time in minutes: | Intrinsic viscosity $[\eta]^5$ after the test | Appearance after the test |
|---|---|---|
| 10 | 0.63 | White. |
| 30 | 0.48 | Light brown. |
| 60 | 0.41 | Somewhat brown. |

(2) Polypivalolactone containing tertiary lauryl mercaptan (Amount of addition: 5.1 percent by weight based on the weight of the polymer).

TABLE 3

| Mercaptans added | Amount of mercaptan added in percent by weight [1] | $[\eta]^5$ intrinsic viscosity after the test | Relative stability |
|---|---|---|---|
| Capryl mercaptan | 4.0 | 0.76 | 0.377 |
|  | 8.0 | 0.98 | 0.197 |
|  | 15.9 | 0.92 | 0.246 |
| Tertiary lauryl mercaptan | 2.5 | 0.95 | 0.221 |
|  | 5.1 | 1.00 | 0.180 |
|  | 10.1 | 0.95 | 0.221 |
| Tertiary dodecyl mercaptan | 5.5 | 0.96 | 0.230 |
|  | 11.0 | 1.10 | 0.098 |
|  | 22.1 | 0.92 | 0.246 |

[1] Based on the weight of the polymer.

The amount of stabilizer added is preferably 2 to 25 percent by weight based on the weight of polypivalolactone. However, a suitable amount of addition of a mercaptan should be selected in order to obtain a polypivalolactone composition adapted to its end use.

Example 4

This example shows the results of carrying out the thermal stability measurement tests described in Example 1 by adding to the polymer each of various conventional stabilizers including tin and zinc derivatives, such as dinormal butyl tin phthalate and zinc laurate, salicylate derivatives, such as phenyl salicylate, polyamides, such as Lacquamide and metal soaps, such as tin stearate. The results are shown in Table 4.

TABLE 4

| $[\eta]^0 \to [\eta]^B$ | Stabilizers added | Amount of stabilizer added in percent by weight [1] | Solvents | Samples after the test | | Relative stability |
|---|---|---|---|---|---|---|
| | | | | Appearance | Intrinsic viscosity $[\eta]^5$ | |
| 1.60→0.82 | Distearyl thiodipropionate | 3.0 | Benzene | Pale yellow | 0.90 | 0.898 |
| | Thiodipropionic acid | 9.7 | Acetone | Gray | 0.74 | 1.104 |
| | Zinc dimethyl dithiocarbamate | 3.3 | ...do | White | 0.50 | 1.411 |
| | 2-mercaptobenzothiazol | 4.6 | ...do | Yellow | 0.82 | 1.000 |
| | 2-mercaptobenzoimidazol | 8.2 | Methanol | Pale yellow | 0.36 | 1.592 |
| 1.73→0.73 | Dibenzyl sulfide | 11.5 | ...do | Brown | 0.99 | 0.740 |
| | Di-normal-butyl tin phthalate | 3.0 | | White | 0.52 | 1.210 |
| | Zinc laurate | 3.0 | | Black | 0.60 | 1.130 |
| 1.67→1.00 | Tertiary butyl phenol salicylate | 17.0 | Acetone | Yellow | 1.07 | 0.896 |
| | Phenyl salicylate | 12.0 | ...do | White | 0.95 | 1.075 |
| 1.73→0.73 | Salicylic acid | 7.5 | ...do | Brown | 0.78 | 0.950 |
| 1.67→1.00 | Lacquamide [2] | 3.0 | Toluene | Blackish brown | 1.13 | 0.806 |
| | Tomide emulsion [3] | 3.0 | | ...do | 0.92 | 1.120 |
| 167→0.73 | Magnesium butyl phenol | 3.0 | Methanol | Pale yellow | 0.90 | 0.930 |
| | Aluminum tolyl benzoate | 3.0 | Acetone | ...do | 0.70 | 1.014 |
| 1.67→0.73 | Tin stearate | 3.0 | | Yellowish brown | 0.98 | 1.030 |
| 1.73→0.73 | Monolauryl phthalate | 3.0 | Toluene | Blackish brown | 0.39 | 1.340 |
| 1.60→0.82 | Phenol-styrene condensate | 3.0 | Bezene | Pale yellow | 0.83 | 0.988 |
| 1.67→1.00 | Triphenyl phosphite | 14.2 | Acetone | White | 0.48 | 1.777 |

[1] Based on the weight of the polymer.
[2] Trademark of a polyamide produced from a dimer of soybean oil fatty acid and ethylene diamine supplied by Japan Reichhold Co.
[3] Trademark of a polyamide emulsion produced from polymerized fatty acid and ethylene diamine.

As is evident from Table 4, conventional stabilizers are not effective for the purpose of the stabilization of polypivalolactones, but the aliphatic and aromatic mercaptans according to the present invention, such as the ones used in Table 1, show remarkable stabilization effects.

Further, the discoloration after heating is less in the case of the addition of aliphatic and aromatic mercaptans than in the case of the addition of other stabilizers.

The embodiments of the invention in which an exclusive property or privilege is claimed are defined as follows:

A composition of matter as claimed in claim 1, in which the mercaptan is selected from the group consisting of normal octadecyl mercaptan, tertiary lauryl mercaptan, normal capryl mercaptan, tertiary dodecyl mercaptan and normal amyl mercaptan.

A composition of matter as claimed in claim 1, in which the mercaptan is thiophenol.

What is claimed:

1. A composition of matter comprising (1) high molecular weight polypivalolactone and (2) an agent for inhibiting decomposition and degradation of the composition by heat and oxygen, from about 2 to about 25 percent by weight, based on the weight of polypivalolactone, of a mercaptan selected from the group consisting of thiophenol and alkyl mercaptans having from 5 to about 18 carbon atoms.

2. A composition of matter as claimed in claim 1, in which the mercaptan is selected from the group consisting of normal octadecyl mercaptan, tertiary lauryl mercaptan, normal capryl mercaptan, tertiary dodecyl mercaptan and normal amyl mercaptan.

3. A composition of matter as claimed in claim 1, in which the mercaptan is thiophenol.

References Cited

UNITED STATES PATENTS

| 2,559,838 | 7/1951 | Anderson | 260—45.7 |
| 2,560,053 | 7/1951 | Webb | 260—45.7 |
| 2,658,055 | 11/1953 | Alderson | 260—78.3 |
| 3,293,225 | 12/1966 | Wakasa | 260—78.3 |
| 2,647,879 | 8/1953 | Sibley | 260—45.7 |

HOSEA E. TAYLOR, JR., Primary Examiner

U.S. Cl. X.R.

260—18, 45.75, 45.85, 857